United States Patent
Hanks et al.

(10) Patent No.: US 11,963,634 B2
(45) Date of Patent: Apr. 23, 2024

(54) ADJUSTABLE WARMING RACK AND METHOD THEREOF

(71) Applicant: North Atlantic Imports, LLC, Logan, UT (US)

(72) Inventors: Christopher L. Hanks, Logan, UT (US); James P. Miner, Preston, ID (US)

(73) Assignee: North Atlantic Imports, LLC, Logan, UT (US)

( * ) Notice: Subject to any disclaimer, the term of this patent is extended or adjusted under 35 U.S.C. 154(b) by 718 days.

(21) Appl. No.: 17/160,189

(22) Filed: Jan. 27, 2021

(65) Prior Publication Data

US 2021/0228020 A1 Jul. 29, 2021

Related U.S. Application Data

(60) Provisional application No. 62/966,496, filed on Jan. 27, 2020.

(51) Int. Cl.
  *A47J 36/24* (2006.01)
  *A47B 43/00* (2006.01)
  *A47B 45/00* (2006.01)
  *A47J 37/07* (2006.01)

(52) U.S. Cl.
  CPC .............. *A47J 36/24* (2013.01); *A47B 43/00* (2013.01); *A47B 45/00* (2013.01); *A47J 37/0786* (2013.01); *A47J 2037/0777* (2013.01); *A47J 2037/0795* (2013.01)

(58) Field of Classification Search
  CPC .... A47B 45/00; A47J 36/24; A47J 2037/0777
  See application file for complete search history.

(56) References Cited

U.S. PATENT DOCUMENTS

| | | | | |
|---|---|---|---|---|
| 3,791,368 A | * | 2/1974 | Hunt | F24C 1/06 126/25 A |
| 4,133,335 A | * | 1/1979 | Malafouris | A47J 37/0763 220/756 |
| 4,488,535 A | * | 12/1984 | Johnson | A47J 37/0763 126/25 A |
| 4,667,651 A | * | 5/1987 | Groeneweg | F24B 1/207 126/25 R |
| 4,896,651 A | * | 1/1990 | Kott, Jr. | F24B 1/205 126/30 |
| 5,575,195 A | * | 11/1996 | Foxford | A47J 37/0763 99/449 |

(Continued)

Primary Examiner — Sean M Michalski
(74) Attorney, Agent, or Firm — David L. Stott

(57) ABSTRACT

Embodiments of an adjustable warming rack as an accessory component for a cooking station are provided. In one embodiment, the warming rack may include a rack panel and first and second legs. The rack panel may extend with an upper panel and a lower panel such that the upper panel is moveable relative to the lower panel to modify a surface area defined by an upper side of the rack panel. The first and second legs are each pivotably coupled adjacent respective first and second opposite sides of the rack panel such that the first and second legs are configured to suspend the rack panel above a flat cooking surface of the cooking station. Further, the first and second legs are pivotably moveable to modify a height that the rack panel is suspended from the flat cooking surface of the cooking station.

20 Claims, 12 Drawing Sheets

(56) References Cited

U.S. PATENT DOCUMENTS

| | | | | |
|---|---|---|---|---|
| 5,730,114 A * | 3/1998 | Fabrikant | A47J 37/0709; 219/453.11 |
| 5,974,954 A * | 11/1999 | Rigney | A47J 37/067; 99/450 |
| 6,119,584 A * | 9/2000 | Hsu | A47J 37/042; 219/400 |
| 6,481,343 B1 * | 11/2002 | Rigney | A47J 37/0786; 99/450 |
| 6,681,759 B2 * | 1/2004 | Bentulan | A47J 37/0704; 126/25 R |
| 7,004,160 B1 * | 2/2006 | Bates | A47J 33/00; 126/30 |
| 7,328,696 B2 * | 2/2008 | Rodriguez | A47J 37/0704; 126/30 |
| 8,304,700 B1 * | 11/2012 | Eilers | A47J 37/0694; 392/347 |
| 8,931,293 B2 * | 1/2015 | Shei | A47J 36/2483; 219/385 |
| 9,901,211 B2 * | 2/2018 | Balcerzak | A47J 37/0786 |
| 10,010,217 B1 * | 7/2018 | Miller | A47J 37/0704 |
| 10,663,177 B2 * | 5/2020 | Nelson | F24C 15/16 |
| 11,129,495 B2 * | 9/2021 | Perry | A47J 37/0763 |
| 2004/0016349 A1 * | 1/2004 | Robertson | A47J 37/0763; 99/449 |
| 2007/0023028 A1 * | 2/2007 | Mortensen | F24B 1/205; 126/30 |
| 2008/0257174 A1 * | 10/2008 | Turner | A23B 4/052; 99/516 |
| 2009/0025569 A1 * | 1/2009 | Hatjopoulos | A47J 45/02; 99/356 |
| 2010/0293979 A1 * | 11/2010 | Shei | A47J 36/24; 62/258 |
| 2011/0239912 A1 * | 10/2011 | Palese | A47B 1/08; 108/85 |
| 2013/0112088 A1 * | 5/2013 | May | A47J 37/041; 99/421 H |
| 2019/0308538 A1 * | 10/2019 | Buchanan | B60N 3/004 |
| 2020/0072474 A1 * | 3/2020 | Nelson | F24C 15/16 |
| 2020/0196797 A1 * | 6/2020 | Yeh | A47J 37/0694 |
| 2021/0068589 A1 * | 3/2021 | Perry | A47J 37/0763 |

* cited by examiner

ADJUSTABLE WARMING RACK AND METHOD THEREOF

CROSS-REFERENCE TO RELATED APPLICATIONS

This application claims the benefit of U.S. Provisional Application No. 62/966,496, filed Jan. 27, 2020, the disclosure of which is hereby incorporated by reference herein in its entirety.

TECHNICAL FIELD

The present invention relates generally to accessory components for outdoor cooking stations and, more specifically, the present invention relates to adjustable warming racks for outdoor cooking stations.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process.

A griddle is a cooking device consisting of a broad flat surface that can be heated using a variety of means and is used in both residential and commercial applications for a variety of cooking operations. The griddle is most commonly a flat metal plate composed of cast or wrought iron, aluminum or carbon steel. Griddles are commonly heated directly or indirectly by open flame or electrical elements. Using a griddle placed directly on a barbeque grill or over flame burners has also become popular when cooking foods not as well suited for cooking directly on a grill over an open flame.

Often large quantities of food are prepared outdoors with a griddle or grill type barbequing station. At such times, difficulties arise with keeping the already cooked food in a warm state. Barbequing stations with pivotably attached hoods often include one or more racks that, when the hood is opened, the racks are positioned above and rearward of the cooking surface and, when the hood is closed, the racks typically move above the cooking surface and within the hood. As food is being cooked, one will typically place the already cooked food on the racks while continuing to cook on the cooking surface. However, with the hood open, the rack's position relative to the cooking surface typically will not keep the food sufficiently warm. Rather, to keep the food warm, one must close the hood of the barbequing station, which ends up interrupting the cooking process. Further, when the hood is closed, the temperature quickly rises to undesirable temperatures for the food being cooked on the grill or griddle as well as the already cooked food on the rack, often resulting in burning the food on the rack and sometimes causing the food to become dry. As such, it would be advantageous to have the ability to keep already cooked food warm without interrupting the cooking process and without causing the cooking temperature of the cooking station to reach undesirable cooking temperatures.

BRIEF SUMMARY OF THE INVENTION

The present invention is directed to various embodiments of a warming rack. In one embodiment, the warming rack is configured to be positioned over a flat cooking surface for keeping cooked food warm. The warming rack includes a rack panel and first and second legs. The rack panel extends between opposite first and second sides and between opposite front and rear sides to define an upper side for placing the cooked food. Further, the rack panel extends with an upper panel and a lower panel, the upper panel moveable relative to the lower panel to modify a surface area defined by the upper side of the rack panel. The first and second legs are each pivotably coupled adjacent the respective first and second sides of the rack panel such that the first and second legs are configured to suspend the rack panel above the flat cooking surface. Further, the first and second legs are pivotably moveable to modify a height that the rack panel is suspended from the flat cooking surface.

In another embodiment, wherein the upper panel slidingly engages the lower panel as the upper panel moves relative to the lower panel. In another embodiment, each of the upper panel and the lower panel define multiple apertures therein, the multiple apertures sized and configured to facilitate convective heat to pass therethrough. In another embodiment, the upper side of the rack panel defines a border portion and a central region, the central region surrounded by the border portion and the central region being suspended above the flat cooking surface by the first and second legs such that the central region is in closer proximity to the flat cooking surface than the border portion.

In another embodiment, the first and second legs are each coupled to only one of the upper panel and lower panel. In another embodiment, the upper panel slidingly engages with the lower panel between a first stop and a second stop, upon moving the upper and lower panels to the first stop the rack panel is in a minimized position and, upon moving the upper and lower panels to the second position, the rack panel is in a fully expanded position.

In another embodiment, the first and second legs each are independently moveable to pivot about a first leg axis and a second leg axis, respectively, so that the rack panel is moveable between a first height and a second height, the second height being smaller than the first height. In still another embodiment, the first and second legs are each independently moveable between an upright position and a pivoted position such that the first and second legs pivot about a first leg axis and a second leg axis, respectively, so that the rack panel is moveable between a first height and a second height, the second height being smaller than the first height and the second height being associated with the first and second legs being in the pivoted position. In another embodiment, the warming rack further includes first and second handles moveable between a handle upright position and a handle storage position such that the first and second handles are pivotable about a first handle axis and a second handle axis, respectively, the handle storage position being along an underside of the rack panel.

In still another embodiment, the first and second legs each are associated with an adjustment member, the adjustment member sized and configured to facilitate incremental pivoting of the first and second legs. In a further embodiment, the adjustment member includes a ribbed structure sized and configured to engage with a fixed structure positioned adjacent the ribbed structure and associated with the rack panel. In another embodiment, the first and second legs each extend with a rod structure with multiple bends along a length thereof so that the rod structure extends between opposite ends, the opposite ends of each of the first and second legs coupled to first and second handles, respectively.

In accordance with another embodiment of the present invention, a warming rack for positioning over a flat cooking surface for keeping cooked food warm is provided. The warming rack includes a multi-panel rack and first and second legs. The multi-panel rack includes at least a first panel and a second panel, the multi-panel rack extending between opposite first and second sides and between opposite front and rear sides to define an upper side for placing the cooked food thereon. The multi-panel rack is moveable between a minimized position and an expanded position with the first panel being moveable relative to the second panel. The first and second legs are each pivotably coupled adjacent the respective first and second sides of the multi-panel rack, the first and second legs configured to suspend the multi-panel rack above the flat cooking surface. The first and second legs are pivotably moveable to modify a height that the multi-panel rack is suspendable above the flat cooking surface.

In another embodiment, the first panel slidingly engages the second panel as the multi-panel rack is moved between the minimized position and the expanded position. In another embodiment, the first and second legs are each coupled to only one of the first panel and the second panel. In still another embodiment, the first panel is slidable relative to the second panel between a first stop and a second stop, wherein upon the multi-panel rack being at the first stop the rack panel is in the minimized position, and wherein upon the multi-panel rack being at the second stop the multi-panel rack is at a fully expanded position.

In another embodiment, the first and second legs each are independently moveable to pivot about a first leg axis and a second leg axis, respectively, so that the multi-panel rack is moveable between a first height and a second height, the second height being smaller than the first height. In still another embodiment, the first and second legs are each independently moveable between an upright position and a pivoted position such that the first and second legs pivot about a first leg axis and a second leg axis, respectively, so that the multi-panel rack is moveable between a first height and a second height, the second height being smaller than the first height and the second height being associated with the first and second legs being in the pivoted position. In another embodiment, the warming rack further includes first and second handles moveable between a handle upright position and a handle storage position such that the first and second handles are pivotable about a first handle axis and a second handle axis, respectively, the handle storage position being along an underside of the rack panel.

In another embodiment, the first and second legs each are associated with an adjustment member, the adjustment member sized and configured to facilitate incremental pivoting of the first and second legs. In a further embodiment, the adjustment member includes a ribbed structure sized and configured to engage with a fixed structure positioned adjacent the ribbed structure and associated with the rack panel. In another embodiment, the first and second legs each extend with a rod structure with multiple bends along a length thereof so that the rod structure extends between opposite ends, the opposite ends of each of the first and second legs coupled to first and second handles, respectively.

In accordance with another embodiment of the present invention, a method for adjusting a warming rack is provided. The method includes the step of: positioning first and second legs of a warming rack over a flat cooking surface to suspend a rack panel of warming rack a first height above the flat cooking surface, the rack panel including an upper panel and a lower panel; pivoting the first and second legs of the warming rack to suspend the warming rack a second height above the flat cooking surface such that the second height is less than the first height; and expanding the rack panel from a minimized position to an expanded position by moving the upper panel relative to the lower panel such that the expanded position of the rack panel extends to define a larger upper side surface than the upper side surface of the rack panel in the minimized position.

In another embodiment, the method further includes pivoting first and second handles of the warming rack from an upright position above the rack panel to a handle pivoted position such that the first and second handles are positioned along an underside surface of the rack panel. In another embodiment, the expanding step includes slidingly engaging the upper panel relative to the lower panel. In still another embodiment, the pivoting includes incrementally pivoting the first and second legs of the warming rack with an adjustment member associated with each of the first and second legs so that the rack panel is moveable to different heights that correspond with an incremental pivoted position of the first and second legs.

In another embodiment, the pivoting step includes incrementally pivoting the first and second legs of the warming rack with an adjustment member associated with each of the first and second legs. In a further embodiment, the incrementally pivoting step includes suspending the rack panel above the flat cooking surface at different heights that corresponds with an incremental pivoted position of the first and second legs. In another embodiment, the expanding step includes slidingly engaging the upper panel relative to the lower panel.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 13A is an enlarged perspective view of the underside of the warming rack taken from region 13A of FIG. 13, according to another embodiment of the present invention;

DETAILED DESCRIPTION OF THE INVENTION

Figure 1:
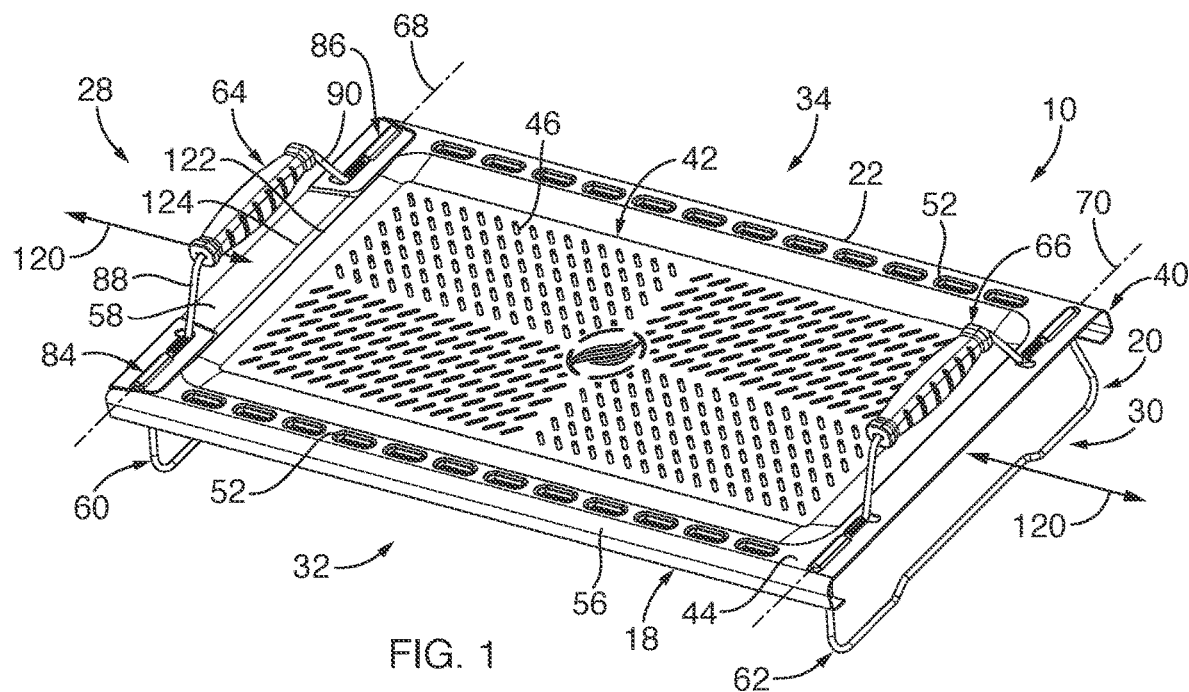
FIG. 1 is a perspective view of a warming rack, depicting a rack panel of the warming rack in a minimized panel position, according to an embodiment of the present invention.
Figure 2:
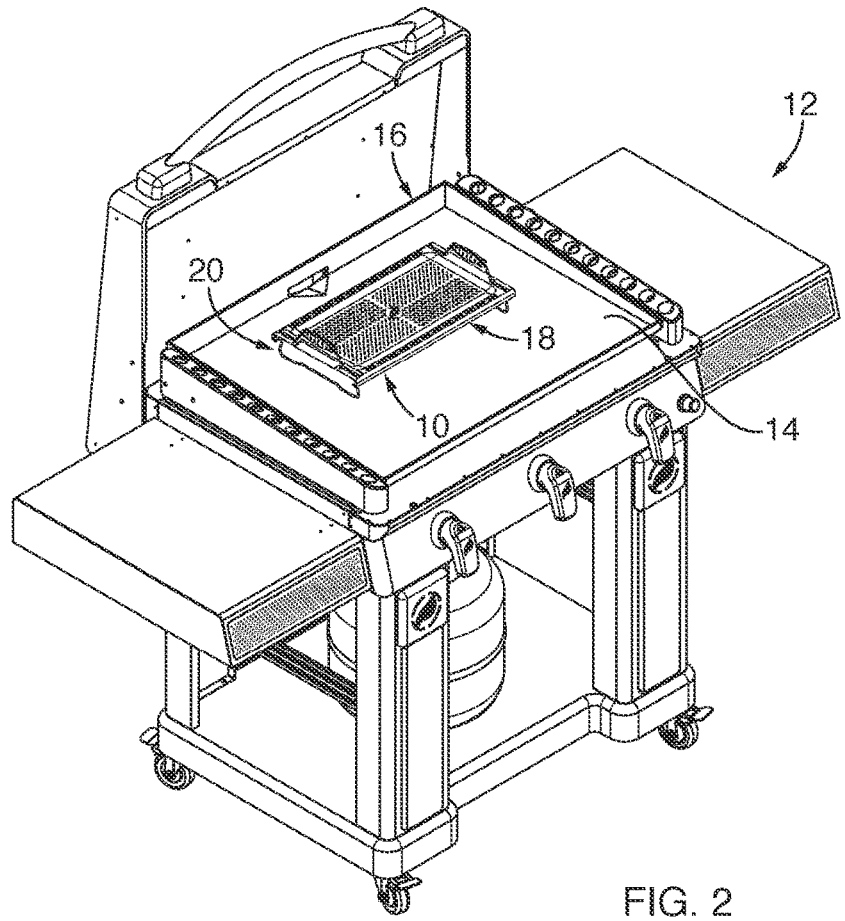
FIG. 2 is a perspective view of the warming rack positioned on a cooking station, according to another embodiment of the present invention.
Figure 20:
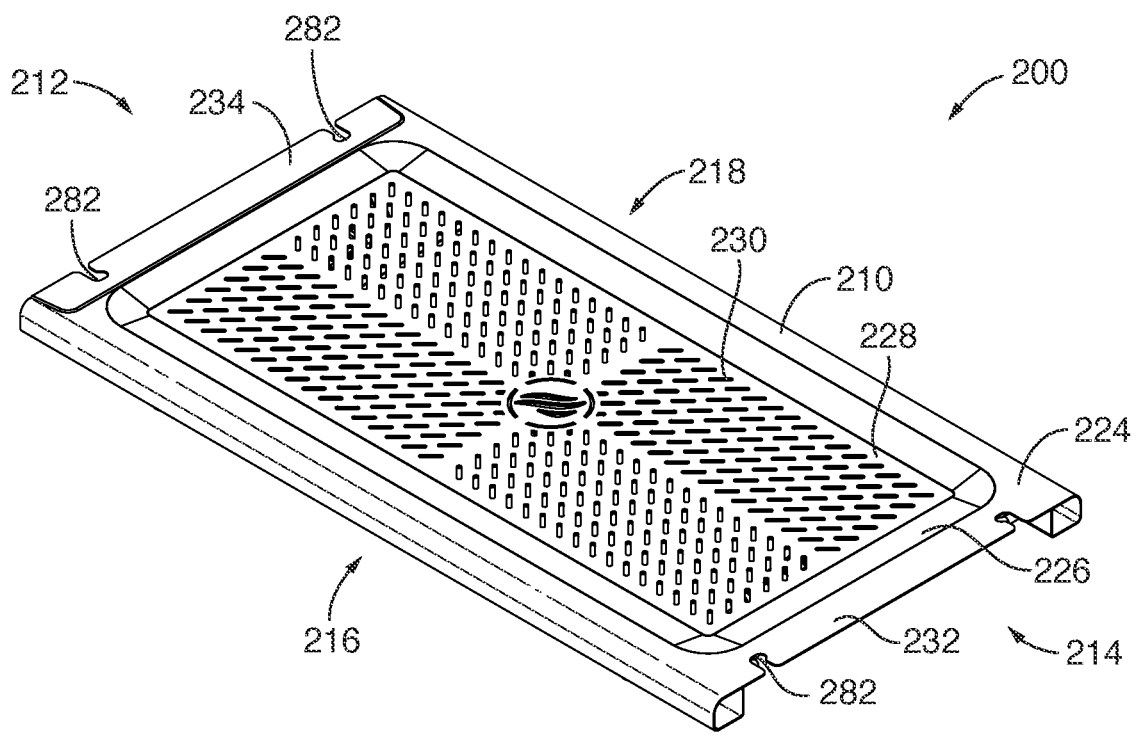
FIG. 20 is a perspective view of the adjustable warming rack of FIG. 11, depicting the rack in the low-profile storage position, according to another embodiment of the present invention.

Referring to FIGS. 1 and 2, one embodiment of a warming rack 10 sized and configured to be employed with a cooking station 12 on, for example, a cooking surface 14 of a griddle 16. In one embodiment, the cooking surface 14 may be a flat cooking surface. The warming rack 10 may be largely made from a metal material, such as stainless steel, and may include some polymeric components integrated with the warming rack 10, as will be set forth herein. The warming rack 10 may include functional and structural characteristics to facilitate suspending food above the cooking surface 14 that may be adjusted in height and/or length. The height adjustment of the warming rack 10 may be employed to adjust the distance that a rack panel 18 may be suspended above the cooking surface 14 by pivoting legs 20 of the warming rack 10 (see, e.g., FIGS. 6, 7 and 8). The length adjustment of the warming rack 10 may be employed to change a surface area or sizing of available space defined by the rack panel 18 for suspending food above the cooking surface 14 (see, e.g., FIGS. 1 and 9). Even further, the warming rack 10 may act as an accessory component for a cooking station 12 and is of the type that may be readily removed from the cooking surface 14 since, in one embodiment, the warming rack 10 is not coupled or connected to components of the cooking station 12, but only positioned to rest directly on the cooking surface 14, as desired. As such, the warming rack 10 is a highly portable accessory component and, as will be described herein, the warming rack 10 is moveable to a compact position, such as the embodiments shown in FIG. 6 or 20, to minimize its footprint at times when it is desired to store the warming rack 10.

Figure 3:
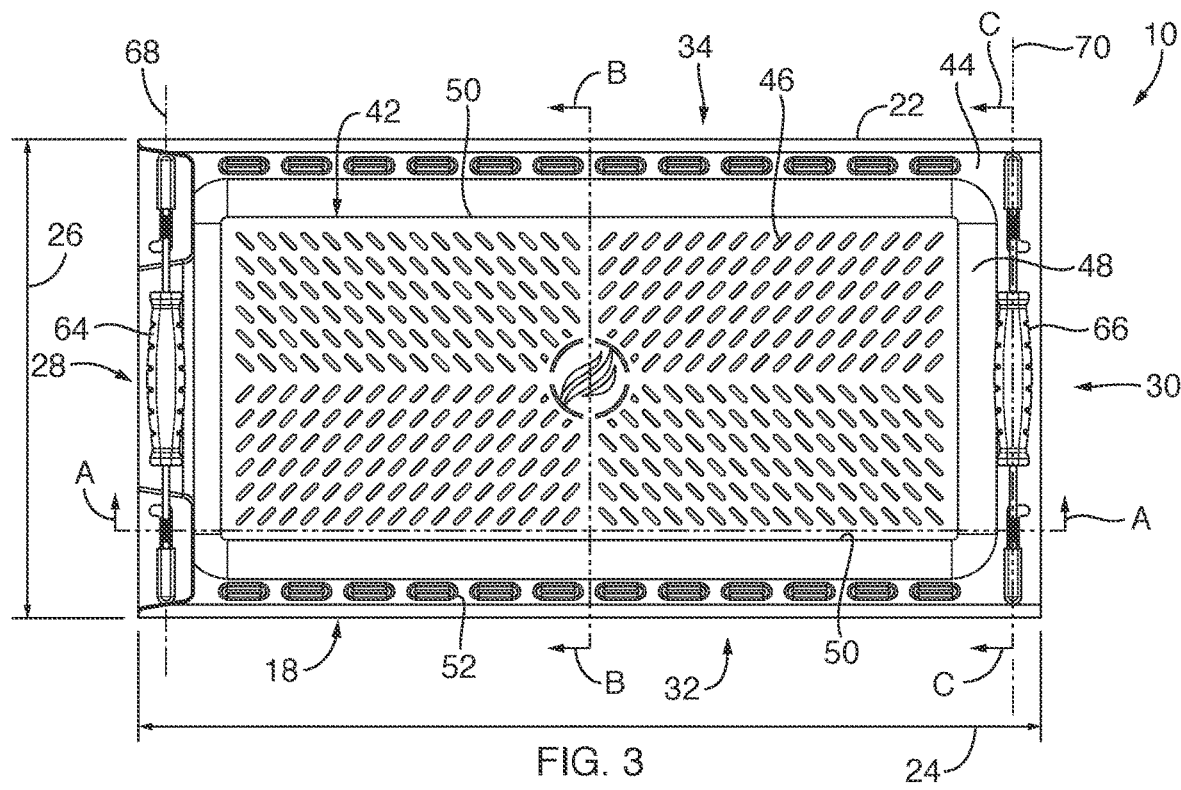
FIG. 3 is a top view of the warming rack of FIG. 1, according to another embodiment of the present invention.
Figure 4:
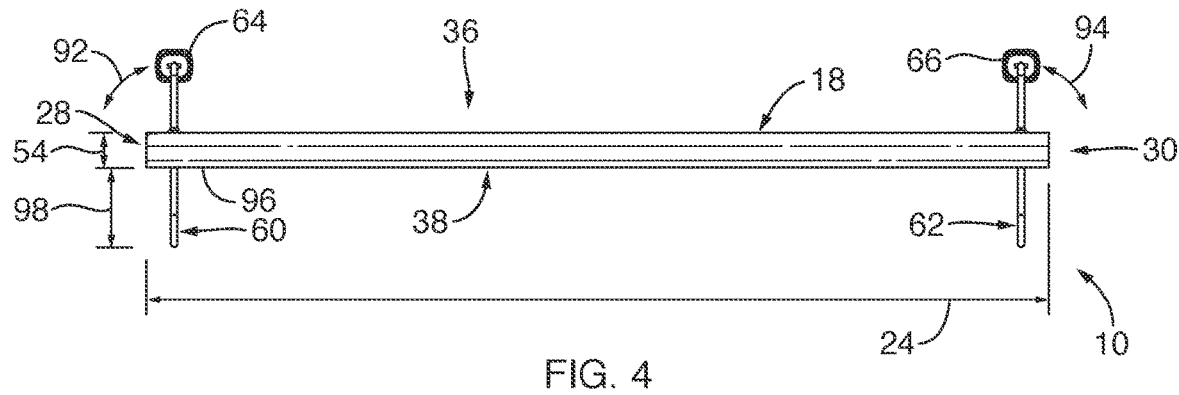
FIG. 4 is a front view of the warming rack of FIG. 1, depicting legs of the warming rack in a first position, according to another embodiment of the present invention.

With reference to FIGS. 1, 3 and 4, as previously set forth, the warming rack 10 includes the rack panel 18 and the legs 20 for suspending the rack panel 18. The rack panel 18 may define a periphery 22 with a rectangular configuration, extending to define a length 24 and a width 26. The length 24 of the rack panel 18 may extend between a first side 28 and a second side 30, the first side 28 being opposite of the second side 30. The width 26 of the rack panel 18 may extend between a front side 32 and a rear side 34, the front side 32 being opposite of the rear side 34. Further, the rack panel 18 may extend to define an upper side 36 and an underside 38, the upper side 36 generally facing opposite of the underside 38 such that a majority of the rack panel 18 extends with a flat structure. The front and rear sides 32, 34 of the rack panel 18 may include a c-shaped channel profile or other lip structure 40, the c-shaped channel extending the length 24 of the front side 32 and rear side 34 of the rack panel 18. In one embodiment, the rack panel 18 may extend with one or more panels or sheet structures that may slidingly engage with an overlapping arrangement, discussed further herein. In another embodiment, the rack panel 18 may extend to define a central region 42 surrounded with a border portion 44, the central region 42 extending to define a majority of the rack panel 18 on which food may be placed to keep warm. The central region 42 of the rack panel 18 may define multiple apertures 46 therein. Such apertures 46 may extend between the upper side 36 and underside 38 of the rack panel 18 so as to extend as through holes. The apertures 46 may be elongated and may be sized and configured to facilitate convective heat to pass therethrough as well as being sized to let food byproducts drain from food placed on the warming rack 10. The apertures 46 may extend with one or more different shapes, extend at various orientations, and/or may provide various patterns that may provide an ornamental characteristic to the rack panel 18.

The border portion 44 of the rack panel 18 may be inset a distance from the periphery 22 of the rack panel 18. The border portion 44 may extend adjacently along the front and rear sides 32, 34 of the rack panel 18 and may extend adjacently along the first and second sides 28, 30 of the rack panel 18. The border portion 44 may generally define the central region 42 of the rack panel 18. In one embodiment, the central region 42 of the rack panel 18 may extend at a lower level than the border portion 44 such that there may be a sloped portion 48 (see also, FIG. 4D) extending from the border portion 44 to the central region 42. Such sloped portion 48 may extend directly from the border portion 44 to the central region 42 along an entire central region periphery 50 of the central region 42. Further, as depicted in FIGS. 4, 4B and 4C, the rack panel 18 may define a depth 54, the depth 54 extending between the upper side 36 and underside 38 of the lip structure 40. In one embodiment, the structure of the sloped portion 48 and central region 42 may extend laterally between or within the expanse of the depth 54 between the lip structure 40 defined along the front and rear sides 32, 34 of the rack panel 18 (see also, FIGS. 3 and 4D). Further, as depicted in FIGS. 1 and 3, in another embodiment, the border portion 44 may define various recesses 52, openings or indent structures therein adjacently along, for example, the front and rear sides 32, 34 of the border portion 44 of the rack panel 18.

Figure 4A:
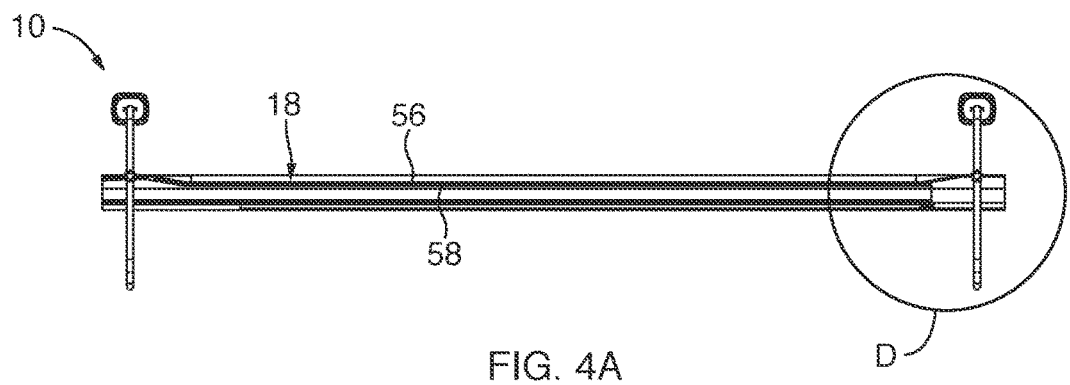
FIG. 4A is a cross-sectional view of the warming rack taken along section line A-A of FIG. 3, according to another embodiment of the present invention.
Figure 4B:
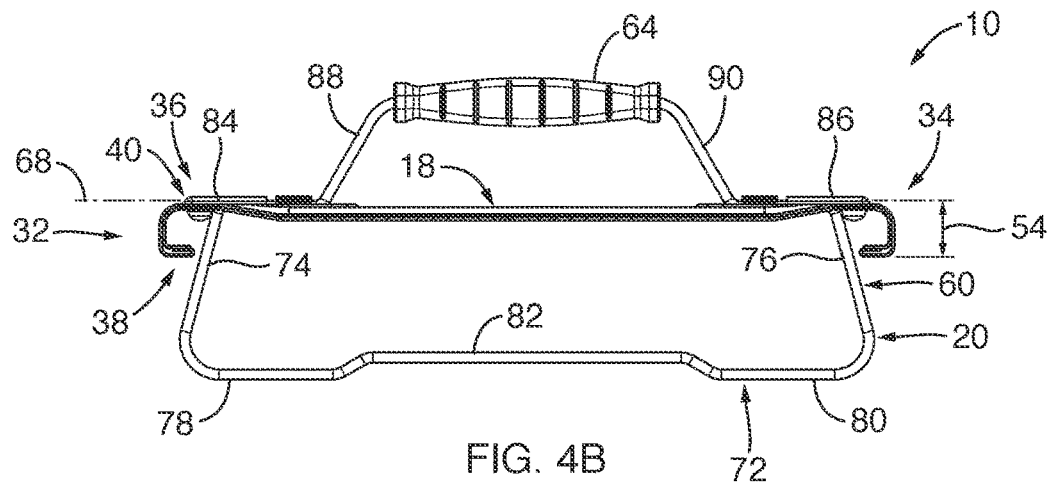
FIG. 4B is a cross-sectional view of the warming rack taken along section line B-B of FIG. 3, according to another embodiment of the present invention.
Figure 4C:
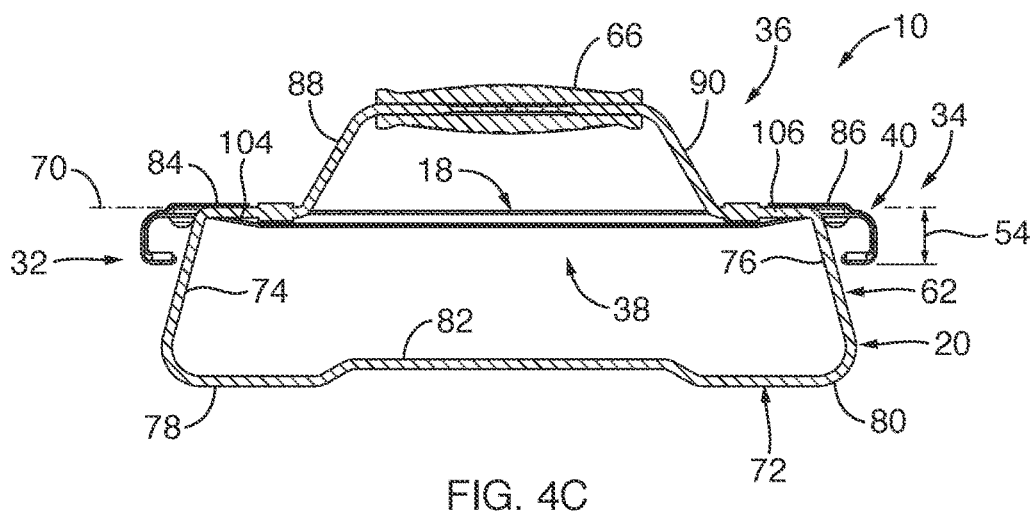
FIG. 4C is a cross-sectional view of the warming rack taken along section line C-C of FIG. 3, according to another embodiment of the present invention.
Figure 4D:
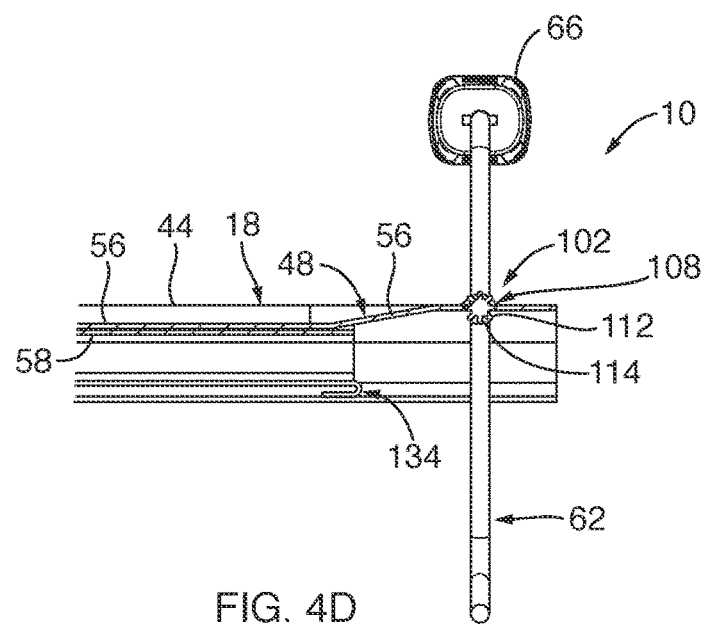
FIG. 4D is an enlarged view of a portion of the warming rack taken from region D of FIG. 4A, according to another embodiment of the present invention.

With reference to FIGS. 4A and 4D, as previously set forth, the rack panel 18 of the warming rack 10 may include multiple panels or sheet structures. For example, the rack panel 18 may extend to define an upper panel 56 and a lower panel 58. Each of the upper and lower panels 56, 58 may define the multiple apertures 46 (FIG. 3), as set forth above. The upper and lower panels 56, 58 may be directly adjacent to each other so as to extend in an overlapping manner. Further, the upper and lower panels 56, 58 may be slidingly engaged relative to each other such that the upper panel 56 may slide relative to the lower panel 58 to move the rack panel 18 between the minimized position and various expanded positions (see FIGS. 1 and 9), discussed in further detail herein.

With reference to FIGS. 1, 3, 4B and 4C, the legs 20 may be positioned and coupled to, or adjacent to, the border portion 44 of the rack panel 18 along the first and second sides 28, 30 of the border portion 44 of the warming rack 10. For example, in one embodiment, the warming rack 10 may include a first leg 60 and a second leg 62. The first leg 60 may be pivotably coupled adjacent to the first side 28 of the warming rack 10 and the second leg 62 may be pivotably coupled adjacent to the second side 30 of the warming rack 10, each of which may extend through the rack panel 18 and be coupled to a respective first handle 64 and second handle 66. Such first and second handles 64, 66 may be formed of, for example, a suitable polymeric material or wood material. Each of the first and second legs 60, 62 may extend with a wire or rod like structure with multiple bends along its length such that opposite ends of the rod like structure may be positioned within opposite sides of the respective first and second handles 64, 66. Further, each of the first and second legs 60, 62 may be pivotably coupled to the rack panel 18 adjacent respective first and second sides 28, 30 of the rack panel 18.

For example, each of the first and second legs 60, 62 may extend below the rack panel 18 and above the rack panel with a generally u-shaped profile, which may extend with several bends therealong. Further, each of the first and second legs 60, 62 may be hingably and/or pivotably coupled to the rack panel 18 so as to rotate or pivot along a respective first leg axis 68 and a second leg axis 70. Each of the first and second legs 60, 62 may include a lower horizontally extending portion 72 with front and rear upward extending portions 74, 76. The lower horizontally extending portion 72 may define a front base 78 and a rear base 80 with a mid horizontally extending portion 82 therebetween, the mid horizontally extending portion 82 extending slightly above the front and rear base 78, 80 so as to define bends therein. In another embodiment, the front and rear base 78, 80 may extend as a single base along the length of the lower horizontally extending portion 72. The front and rear upward extending portions 74, 76 of each of the first and second legs 60, 62 may extend to the rack panel 18 and may bend inward and extend toward each other to define front and rear leg hinges 84, 86. In one embodiment, the front and rear leg hinges 84, 86 of each of the first and second legs 60, 62 may extend along the first and second leg axes 68, 70, respectively, such that the front and rear leg hinges 84, 86 rotate or pivot about the first and second leg axes 68, 70. Further, the front and rear leg hinges 84, 86 may continue to extend inward and upward to define front and rear handle extensions 88, 90 which may bend inward to extend in opposite ends of a bore defined in the first and second handles 64, 66. The first and second leg hinges 84, 86 may be at least partially surrounded by a portion of the border portion 44 of the rack panel 18 such that a portion of the legs sits within a recess or indented portion of the rack panel 18.

Further, in one embodiment, the first and second leg axes 68, 70 may extend parallel relative to each other. In another embodiment, the first leg axis 68 may extend substantially parallel with the lower horizontal extending portion 72, the front base 78, the rear base 80, and/or the mid horizontally extending portion 82. Similarly, the second leg axis 70 may extend substantially parallel with the lower horizontal extending portion 72, the front base 78, the rear base 80, and/or the mid horizontally extending portion 82. In another embodiment, the first and second leg axes 68, 70 may extend transverse relative to a lower most portion of the respective first and second legs 60, 62.

Figure 5:
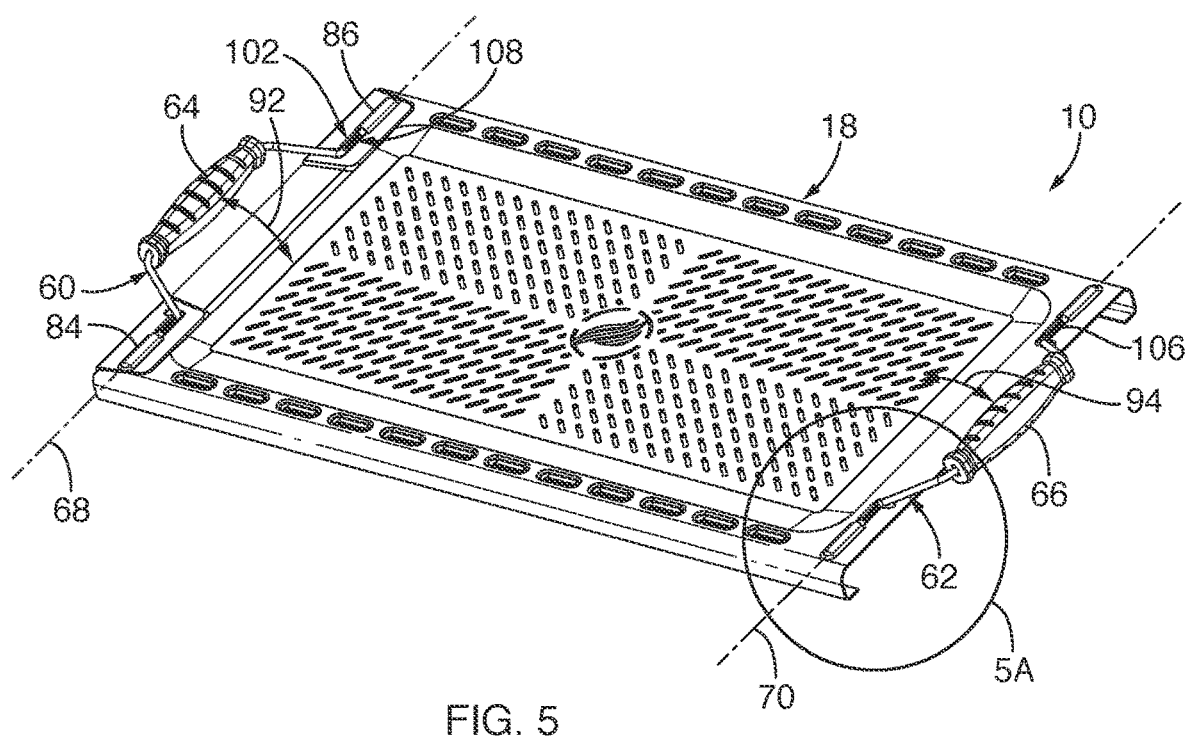
FIG. 5 is a perspective view of the warming rack, depicting handles pivoted outward to move the legs to a second position, according to another embodiment of the present invention.
Figure 6:
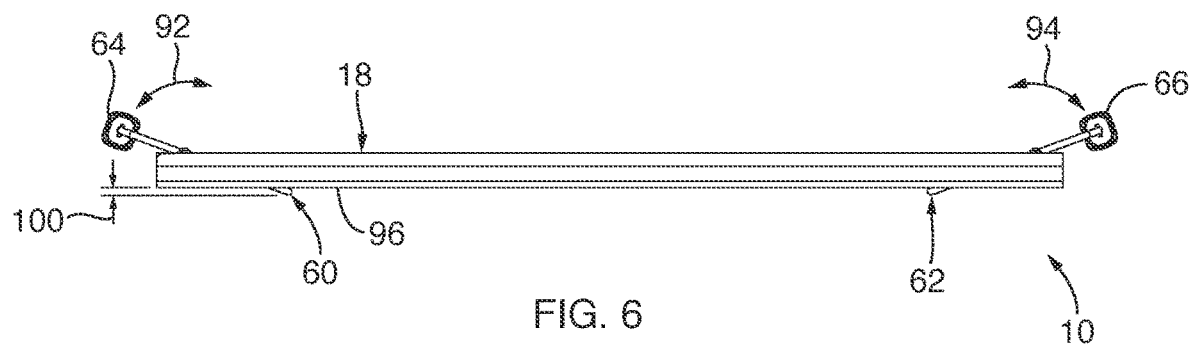
FIG. 6 is a front view of the warming rack of FIG. 5, depicting the legs in a second position, according to another embodiment of the present invention.

Now with reference to FIGS. 4, 5 and 6, the first and second legs 60, 62 may be pivoted between a first position (FIG. 4) or upright position and a second position (FIG. 6) or fully pivoted position (or one of various pivoted positions). Such pivoting of the first and second legs 60, 62 may be employed by rotating or pivoting the first and second handles 64, 66, as shown by respective rotational arrows 92, 94. For example, in one embodiment, the first handle 64 may be rotated counter-clockwise, as shown by arrow 92, to move the first leg 60 from the first position to the second position and, the first handle 64 may be rotated or pivoted clockwise to move the first leg 60 from the second position to the first position. Similarly, the second handle 66 may be rotated or pivoted clockwise, as shown by arrow 94, to move the second leg 62 from the first position to the second position and, the second handle 66 may be rotated or pivoted counter-clockwise, as shown by arrow 94, to move the second leg 62 from the second position to the first position. In the first position, a lower most surface 96 of the rack panel 18 may be a first height 98 from, for example, a cooking surface or underside surface of the first and second legs 60, 62. In the second position or fully pivoted position, the lower most surface 96 of the rack panel 18 may be a second height 100 from the cooking surface or the underside surface of the first and second legs 60, 62. As depicted, the first height 98 may be a greater distance than the second height 100. With this arrangement, the rack panel 18 may be suspended above the cooking surface by the legs 20 at the first height 98 or the second height 100, depending upon the first and second legs 60, 62 being in the respective first position or second position. In another embodiment, the rack panel 18 may be suspended above the cooking surface at various intermediate heights or various heights that may be between the first and second heights 98, 100.

Figure 5A:
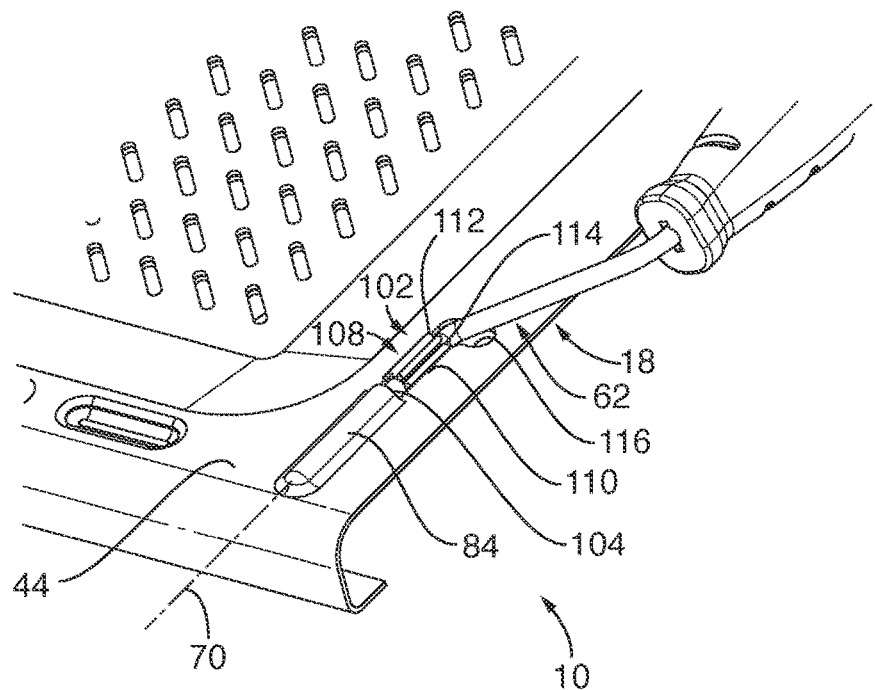
FIG. 5A is an enlarged view of the warming rack taken from region 5A of FIG. 5, depicting one adjustment member associated with one of the legs, according to another embodiment of the present invention.

With reference to FIGS. 4D, 5 and 5A, each of the first and second legs 60, 62 of the warming rack 10 may be associated with an adjustable member 102. In one embodiment, the adjustable member 102 may be positioned along front and rear horizontal portions 104, 106 (see FIG. 4C) of the first and second legs 60, 62 and adjacent each of the front and rear leg hinges 84, 86. As depicted in FIG. 4C, the front and rear horizontal portions 104, 106 extend inward from the respective front and rear upward extending portions 74, 76 such that the front and rear horizontal portions extend level with the rack 18 and toward the adjustable member 102, the front and rear leg hinges 84, 86 and the adjustable member 102 being a portions of the front and rear horizontal portions 104, 106.

With reference again to FIGS. 4D, 5 and 5A, in another embodiment, the adjustable member 102 may be positioned along only one of the front or rear horizontal portions 104, 106 of the first and second legs 60, 62. The adjustable member 102 may extend with structure that may be sized and configured to facilitate incremental pivoting of the first and second legs 60, 62. For example, in one embodiment, the adjustable member 102 may include a ribbed structure 108 that catches against an adjacent fixed structure 110, such as a portion of the rack panel 18, or any other structure, such as a protrusion. The ribbed structure 108 may define multiple ribs 112 extending radially relative to, for example, the second leg axis 70 (as depicted in FIG. 5A). Further, the ribbed structure 108 may include multiple ribs 112 extending longitudinally along or parallel with the second leg axis 70 so as to extend radially about the second leg axis 70. Further, such ribbed structure 108 may define channels 114 between each of the multiple ribs 112. The ribbed structure 108 may be a fixed component relative to the corresponding first or second legs 60, 62. In another embodiment, the ribbed structure 108 may be integrally formed with the corresponding first and second legs 60, 62. In this manner, as the first or second legs 60, 62 pivot about the first or second leg axes 68, 70, the ribbed structure 108 also rotates with the corresponding one of the first or second legs 60, 62.

As previously set forth, the adjustable member 102 associated with each of the first and second legs 60, 62 may facilitate incremental pivoting of the first and second legs 60, 62 to facilitate the first and second legs 60, 62 being pivoted in an incremental arrangement, thereby, facilitating the rack panel 18 to be adjusted to various incremental heights (e.g., relative to the cooking surface) between the first position and the second position. For example, the adjustable member 102 such as the ribbed structure 108 may interact with the rack panel 18 or an interacting adjacent fixed structure 110 associated with the rack panel. The fixed structure 110 may be sized and configured to hold and maintain the first and second legs 60, 62 in a desired position with the fixed structure 110 positioned within or adjacent one of the channels 114 defined by adjacently extending ribs 112. Upon a user placing a rotational force 92, 94 to, for example, the first and second handles 64, 66 to pivot the respective first and second legs 60, 62, the ribbed structure 108 may rotate so that the fixed structure 110 slips over one of the ribs 112 and into an adjacent channel 114 to change the held and maintained position of the first and second legs 60, 62. Similarly, if the user desires to further pivot the first and second legs 60, 62 to change the height of the rack panel 18, the user can rotate the handles, as previously set forth, until the desired height of the rack panel 18 (relative to the cooking surface) is obtained, held and maintained in place with the fixed structure 110 positioned within one of the channels 114 between adjacent ribs 112.

In one embodiment, the ribbed structure 108 may be a rigid member that may interact with an adjacent rigid fixed structure 110, such as the rack panel 18 or structure associated with the rack panel 18. In another embodiment, the ribbed structure 108 may be a rigid member that may interact with a non-rigid fixed structure 110 coupled to the rack panel 18 at a position adjacent the ribbed structure 108 so that the interacting fixed structure 110 appropriately interacts with the ribbed structure 108. In another embodiment, the ribbed structure 108 may be a non-rigid structure that may cooperate with the interacting fixed structure 110, such as a portion of the adjacently positioned rack panel 18. In another embodiment, the ribbed structure 108 and the interacting fixed structure 110 may be non-rigid structures. The non-rigid structures may be formed of a polymeric material, with high temperature ratings, formed with a protrusion type structure or similarly ribbed structure such that the protrusion or ribs may deform or flex at their end to facilitate engagement and characteristics to deform and slip pass its cooperating structure upon placing a threshold force to pivot the first and second legs 60, 62. Upon moving the first and second legs 60, 62 to a pivoted position, the rack panel 18 may define a notch 116 (see FIG. 5A) or opening within the border portion 44 of the rack panel 18 such that the notch 116 or opening may be sized and configured to allow the correspond leg to move to any one of the pivoted positions, via the adjustable member 102, without the legs interfering with the rack panel 18.

Figure 9:
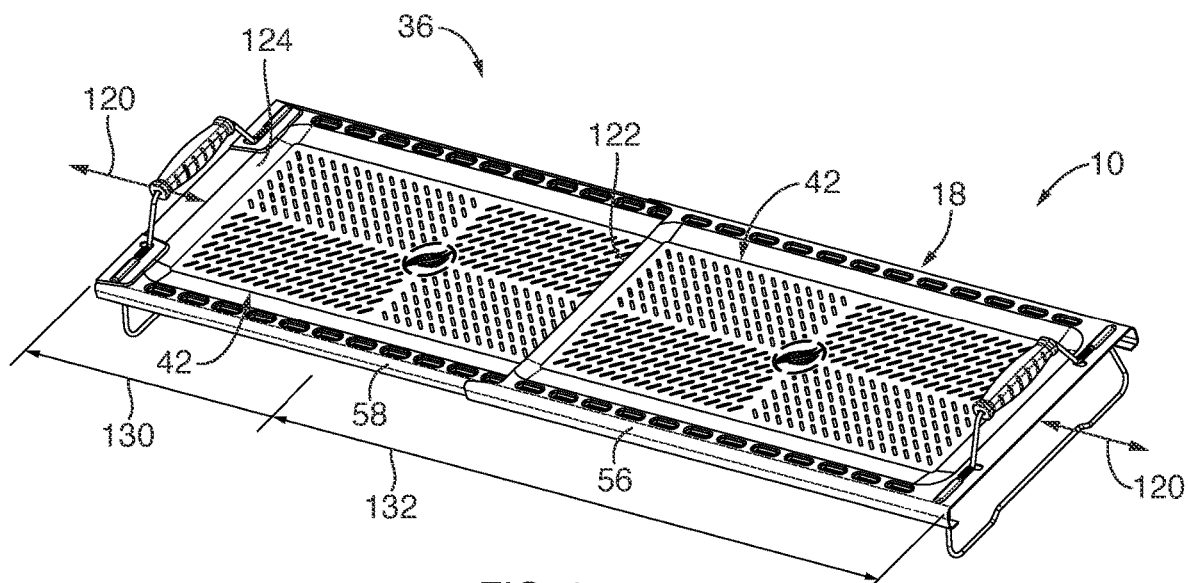
FIG. 9 is a perspective view of the warming rack, depicting the rack panel in an expanded panel position, according to another embodiment of the present invention.
Figure 10:
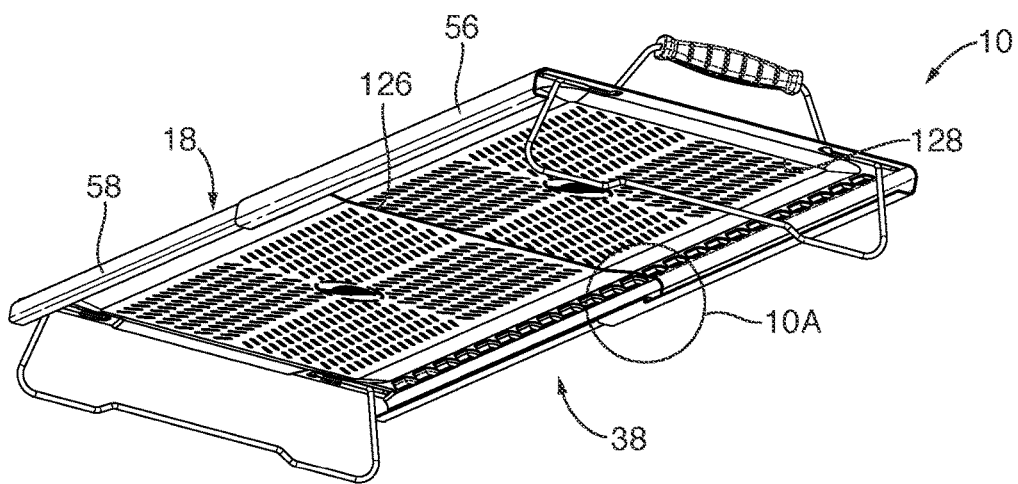
FIG. 10 is an underside perspective view of the warming rack with the rack panel in the expanded panel position, according to another embodiment of the present invention.

Now with reference to FIGS. 1, 9 and 10, as previously set forth, the rack panel 18 of the warming rack 10 may be moved between a minimized position (FIG. 1) and a fully expanded position (FIG. 9). Further, the rack panel 18 may be moved to multiple intermediate expanded positions, the intermediate expanded positions being various expanded positions between the minimized position and the fully expanded position. As previously set forth, the rack panel 18 may include the upper and lower panels 56, 58, such that in the minimized position, most of the upper panel 56 overlaps the lower panel 58. Such upper and lower panels 56, 58 of the rack panel 18 may be slidingly engaged so as to be linearly moveable relative to each other, as shown by bi-linear arrows 120. Such bi-linear movement of the upper panel 56 relative to the lower panel 58 is employed between a first hard stop and a second hard stop with structure integrated within the rack panel 18. For example, upon moving the rack panel 18 from any one of the expanded positions toward the minimized position, the upper and lower panels 56, 58 move inward to the first hard stop to be at the minimized position of the rack panel 18. Such first hard stop may be employed with one end 122 of the upper panel 56 being stopped from further movement upon abutting against an upper end portion 124 of the lower panel 58 and/or one end 126 of the lower panel 58 abutting an underside end portion 128 of the upper panel 56 (see FIG. 10) as viewed from the underside 38 of the rack panel 18. In the minimized position, the rack panel 18 extends with the length 24 and width 26 (see FIG. 3), as previously described, to define the central region 42 for warming food on the upper side 36 of the rack panel 18. Further, upon the rack panel 18 being moved to the minimized position at the first hard stop, the rack panel 18 cannot be minimized any further in its length 24. Upon moving the upper and lower panels 56, 58 outward relative to each other, the rack panel 18 may be moved to the second hard stop to be at the fully expanded position of the rack panel 18. In the fully expanded position, the rack panel may be extended to define a fully expanded length 130. Similarly, upon the rack panel 18 being moved to the various intermediate expanded positions, the rack panel 18 may be extended to correspond to various intermediate lengths 132. Further, upon moving the upper panel 56 relative to the lower panel 58 to a fully expanded position, the upper panel 56 is prevented from further outward movement relative to the lower panel 58 at the second hard stop. Further, the width 26 of the rack panel 18 may remain constant as the rack panel 18 is moved to any one of the minimized and expanded positions of the rack panel while the length may be adjusted relative to its extension, as previously set forth.

Figure 7:
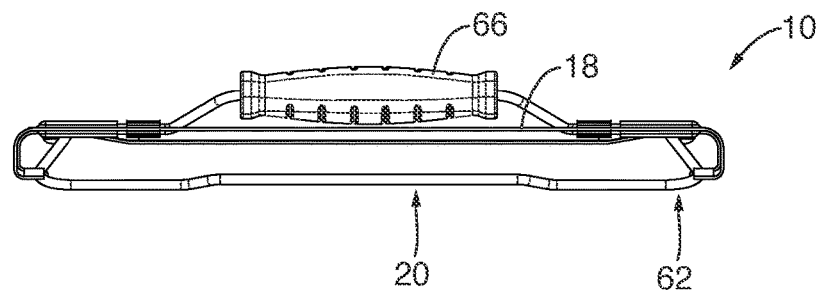
FIG. 7 is a side view of the warming rack with the legs in the second position, according to another embodiment of the present invention.
Figure 8:
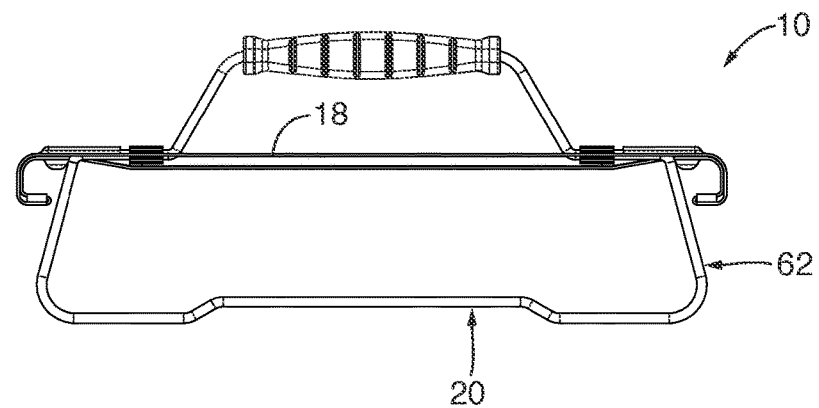
FIG. 8 is a side view of the warming rack, depicting the legs in the first position, according to another embodiment of the present invention.
Figure 10A:
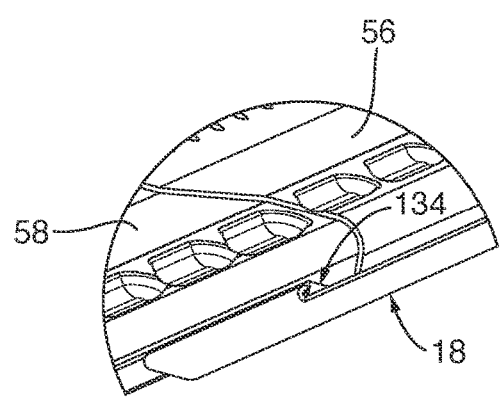
FIG. 10A is an enlarged view of the warming rack taken from region 10A of FIG. 10, according to another embodiment of the present invention.
Figure 11:
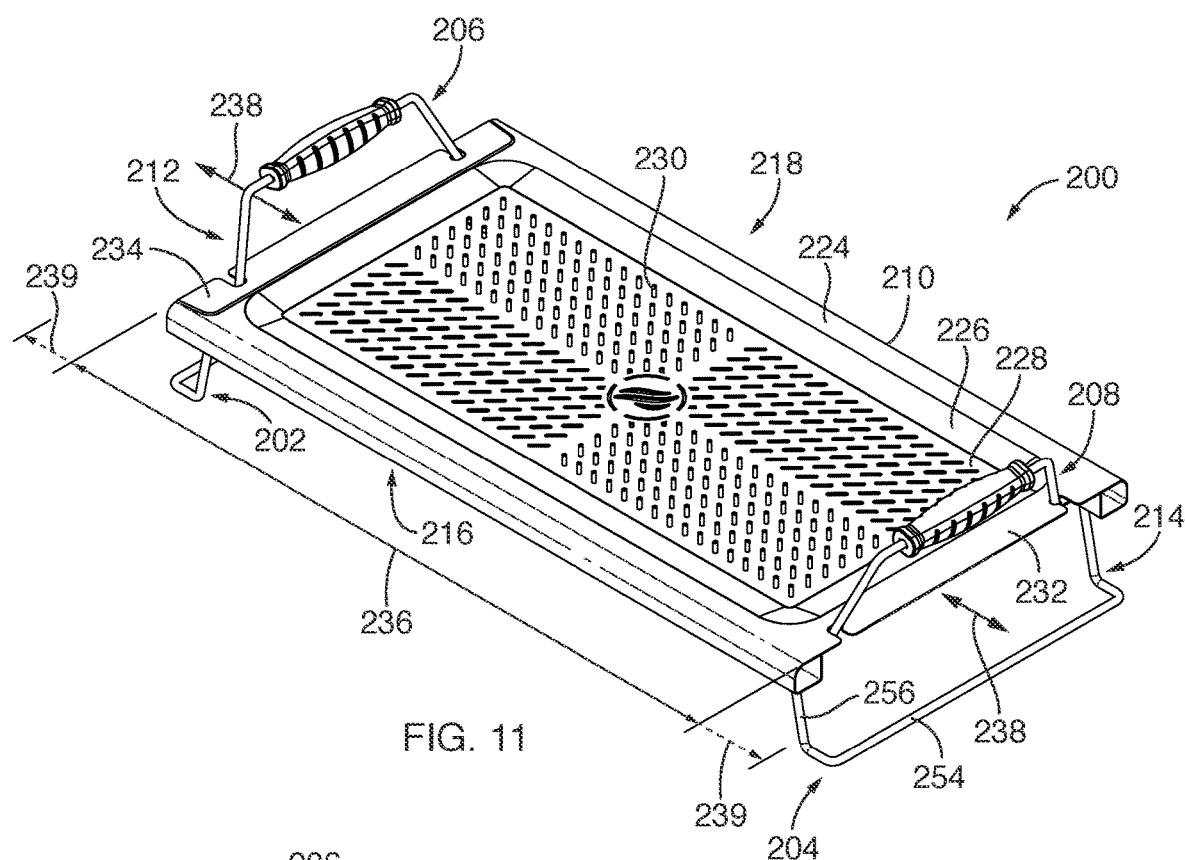
FIG. 11 is a perspective view of another embodiment of an adjustable warming rack, depicting the warming rack in a minimized position, according to the present invention.
Figure 12:
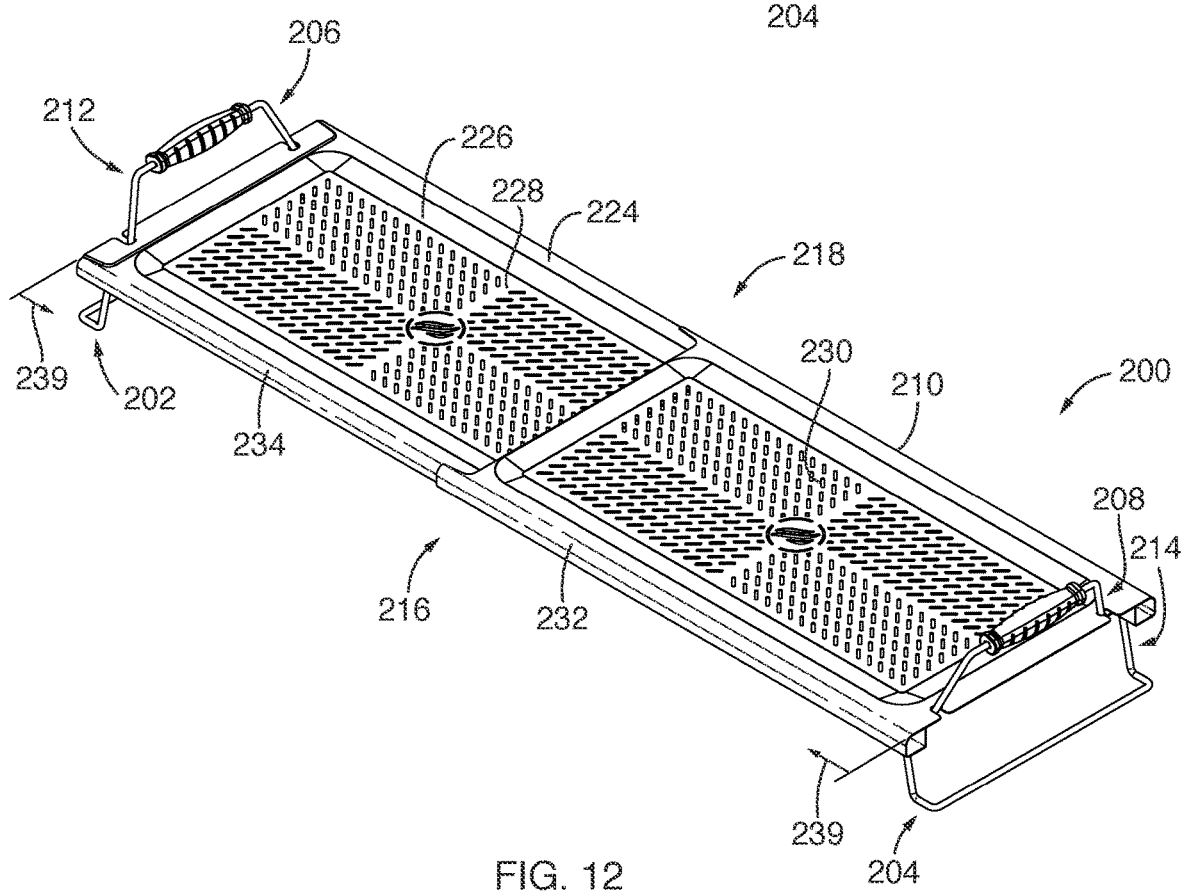
FIG. 12 is a perspective view of the adjustable warming rack of FIG. 11, depicting the warming rack in an expanded position, according to another embodiment of the present invention.
Figure 13:
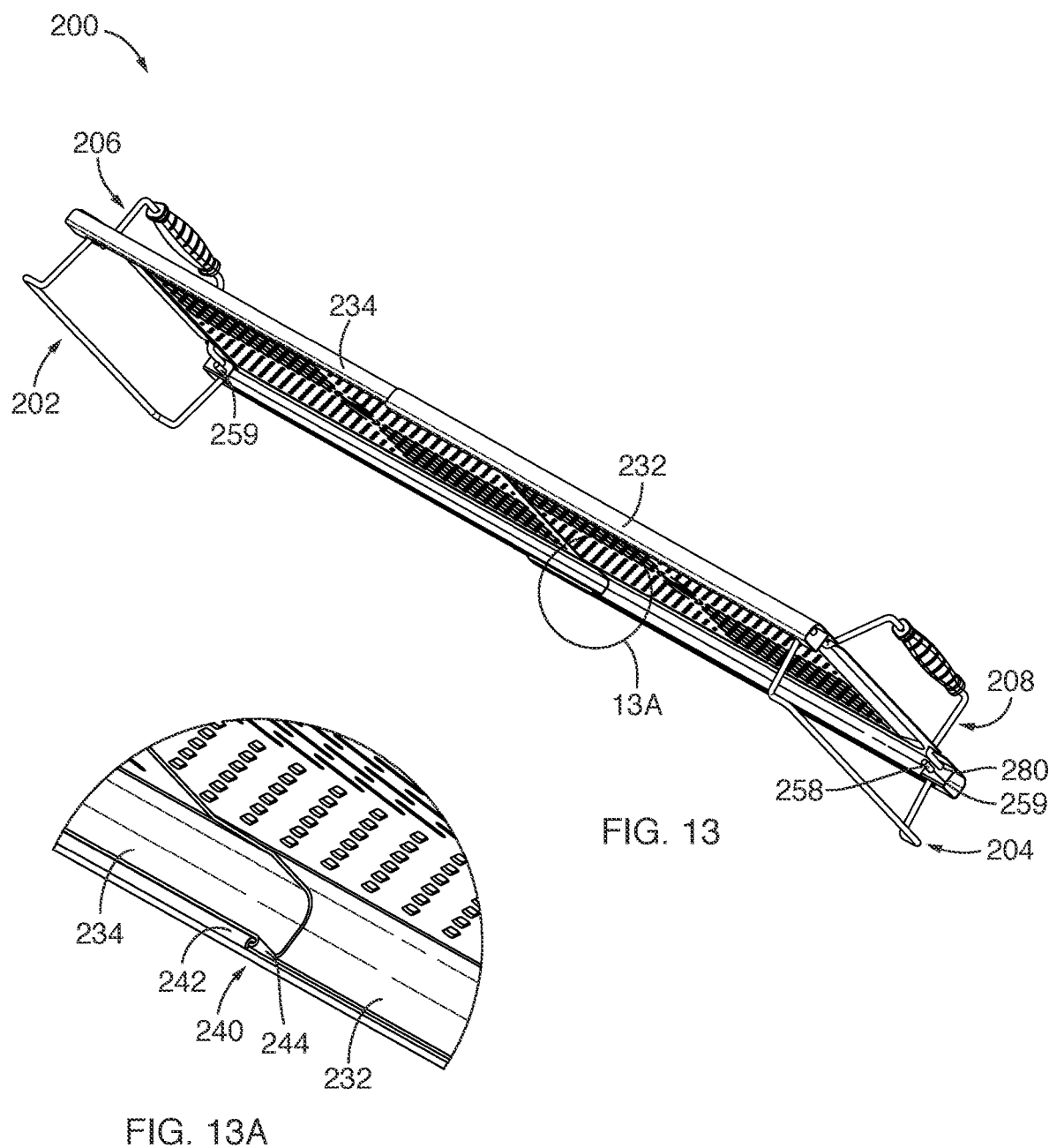
FIG. 13 is an underside perspective view of the adjustable warming rack in the expanded position, according to another embodiment of the present invention.

As depicted in FIGS. 4D and 10A, the second hard stop may be employed with abutment structure 134. Such abutment structure 134 may be a lip or protrusion that may be integrated in the upper or lower panels 56, 58 that prevents further outward movement of the upper and lower panels 56, 58 and provides the second hard stop of the rack panel 18 in its fully expanded position and fully extended length 130. In this manner, the warming rack 10 may employed over a cooking surface 14, such as the griddle 16 (FIG. 2), such that the warming rack 10 may be moved to various expanded positions (FIG. 10) or in a minimized position (FIG. 1), as desired. Further, the warming rack 10 may be modified in its height above the cooking surface 14, while in any one of the expanded positions or minimized position, by pivoting the handles 64, 66 to thus pivot the legs 60, 62 to suspend the rack panel to the height desired, as depicted in FIGS. 6 and 7 with the legs moved to the fully pivoted position, or as depicted in FIGS. 4 and 8 with the legs 60, 62 in the upright or non-pivoted position. With this arrangement, the warming rack 10 may be readily adjusted so that the central region 42 of the rack panel 18 can hold the amount of food desired while also adjusting the height of the rack panel 18, as desired, from the cooking surface to effectively keep the food warm on the warming rack 10.

Now with reference to FIGS. 11-20, another embodiment of an adjustable warming rack 200 is provided. In this embodiment, the adjustable warming rack 200 may include similar structural features as the embodiments described in FIGS. 1-10, except legs and handles of the rack may move independent of each other. For example, the rack 200 may include first and second legs 202, 204 and first and second handles 206, 208 such that the first leg 202 may be independently moveable relative to the first handle 206. Similarly, the second leg 204 of the rack 200 may be independently moveable relative to the second handle 208. As indicated, the rack 200 may be substantially similar structurally from the previous embodiment such that the rack 200 may extend with a generally flat profile, but for the legs and handles, and may be elongated with a rectangular shape. The rectangular shape of the rack 200 may extend with a periphery 210, the periphery 210 extending between first and second sides 212, 214 and front and rear sides 216, 218. Further, the rack 200 may define an upper side 220 and an underside 222. The upper side 220 may extend with an upper peripheral portion 224, one or more sloped surfaces 226, and a central portion 228, the sloped surfaces 226 extending inward from the periphery 210 and the upper peripheral portion 224 to the central portion 228. In this manner, the central portion 228 of the upper side 220 may exhibit an indented portion of the upper side 220 of the rack 200. The central portion 228 may extend and be sized to hold cooked food thereon. Further, the central portion 228 may exhibit multiple apertures 230 extending completely through panels of the rack 200. The apertures 230 may be sized and configured to facilitate draining grease from food product and/or for facilitating convective heat from the griddle cooking surface 14 (FIG. 2) to move through the apertures 230 of the central portion 228 for heating the food product.

With reference to FIGS. 11, 12, 13 and 13A, similar to the previous embodiment, the adjustable warming rack 200 may extend with a multi-panel rack so as to include at least an upper panel 232 and a lower panel 234 that may slidingly engage relative to each other. Such sliding engagement of the upper and lower panels 232, 234 may be moveable in the lengthwise direction or along an elongated length 236 of the upper and lower panels 232, 234 as shown by bi-directional arrow 238. Such movement of the upper and lower panels 232, 234 may be linear movement. The elongated length 236 of the rack 200 may be modified or adjusted as depicted by adjustable length arrows 239 so as to be movably expandable to various expanded positions. The upper and lower panels 232, 234 may be slidingly moveable between a minimized size (see FIG. 11) and a fully expanded size (see FIG. 12) and various expanded sizes therebetween. The upper and lower panels 232, 234 may stop their outward lengthwise movement upon reaching the fully expanded size with stopper structure 240 (see FIG. 13A) between the upper and lower panels 232, 234. The stopper structure 240 may include a first protrusion 242 extending from the upper panel 232 and a second protrusion 244 extending from the lower panel 234, for example. The first and second protrusions 242, 244 may be sized and configured to abut each other so as to block further linear movement of the upper and lower panels 232, 234.

With reference to FIGS. 11, 14, 15, and 15A, as previously set forth, the legs of the adjustable warming rack 200 may be held in an upright position so that the rack may be positioned a first height 250 from the cooking surface 14 (FIG. 2) or so that the legs are suspending the rack 200 the first height 250 above a bottom surface 252 of the first and second legs 202, 204. Each of the first and second legs 202, 204 may move independently and may extend with rod structure with multiple bends along a length of the rod structure. For example, the rod structure may include an intermediate base 254, extensions 256, and opposite end portions 258. The opposite end portions 258 may extend with free ends so that the end portions 258 may be held within oppositely facing leg apertures 259 (FIG. 13), the end portions 258 for each of the first and second legs 202, 204 oriented to define first and second leg axes 260, 262. The extensions 256 may be defined between bends of the end portions 258 and bends of the intermediate base 254. With the first and second legs 202, 204 in the upright position, the extensions 256 may extend upward from the intermediate base 254 and be held at the upright position via the extensions 256 being biasingly held within a notch 264 (see FIG. 17A) defined in the underside 222 of the corresponding one of the upper and lower panels 232, 234. The intermediate base 254 of the first and second legs 202, 204 may be sized and configured to stabilize and support the warming rack 200 in the upright position at the first height 250 with the notch 264 holding the extensions 256 of the first and second legs 202, 204 in the upright position.

Figure 14:
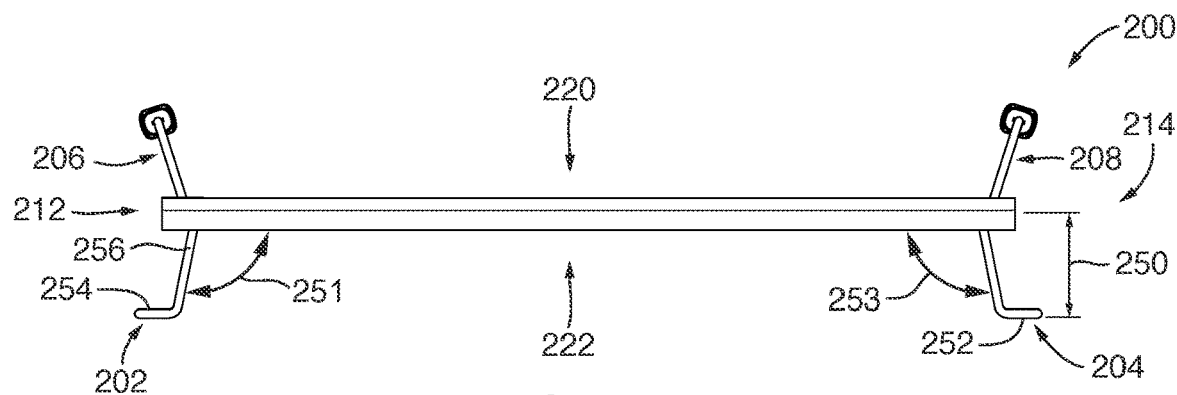
FIG. 14 is a side view of the adjustable warming rack of FIG. 11, depicting legs of the rack in an upright position, according to another embodiment of the present invention.
Figure 15:
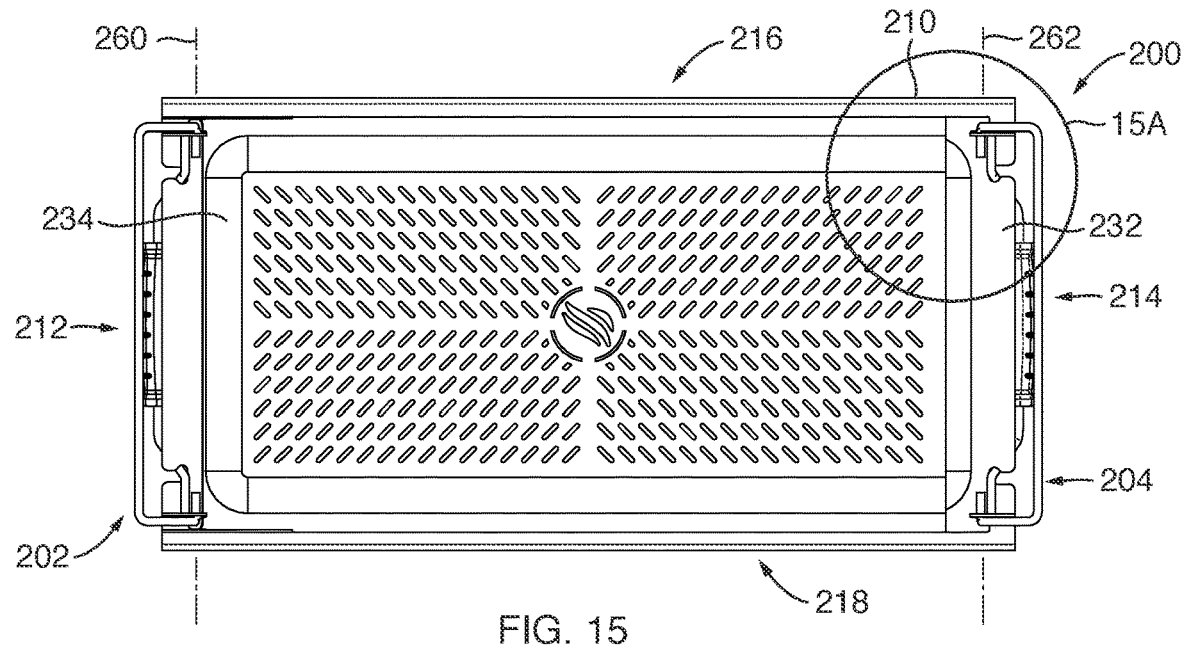
FIG. 15 is a bottom view of the adjustable warming rack with the legs of the rack in the upright position, according to another embodiment of the present invention.
Figure 15A:
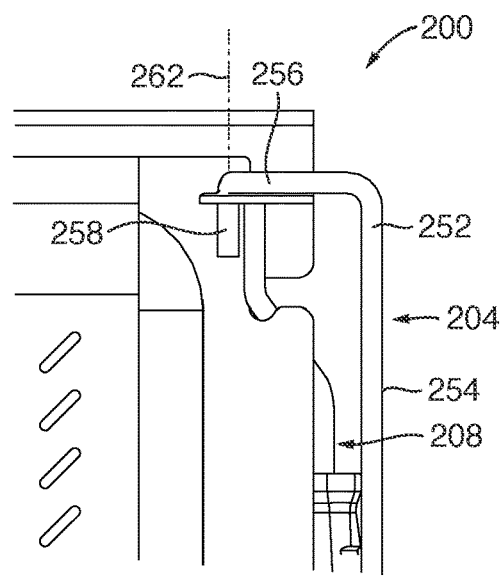
FIG. 15A is an enlarged bottom view of the adjustable warming rack taken from region 15A of FIG. 15, according to another embodiment of the present invention.
Figure 16:
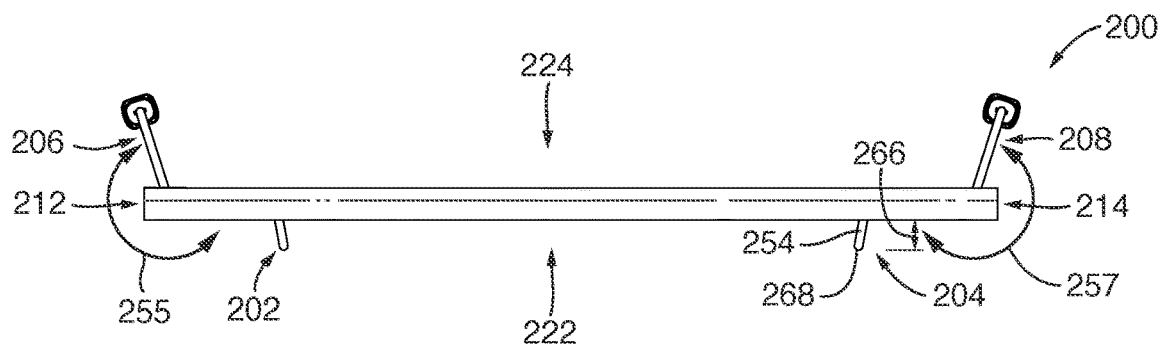
FIG. 16 is a side view of the adjustable warming rack of FIG. 11, depicting the legs of the rack in a folded position, according to another embodiment of the present invention.
Figure 17:
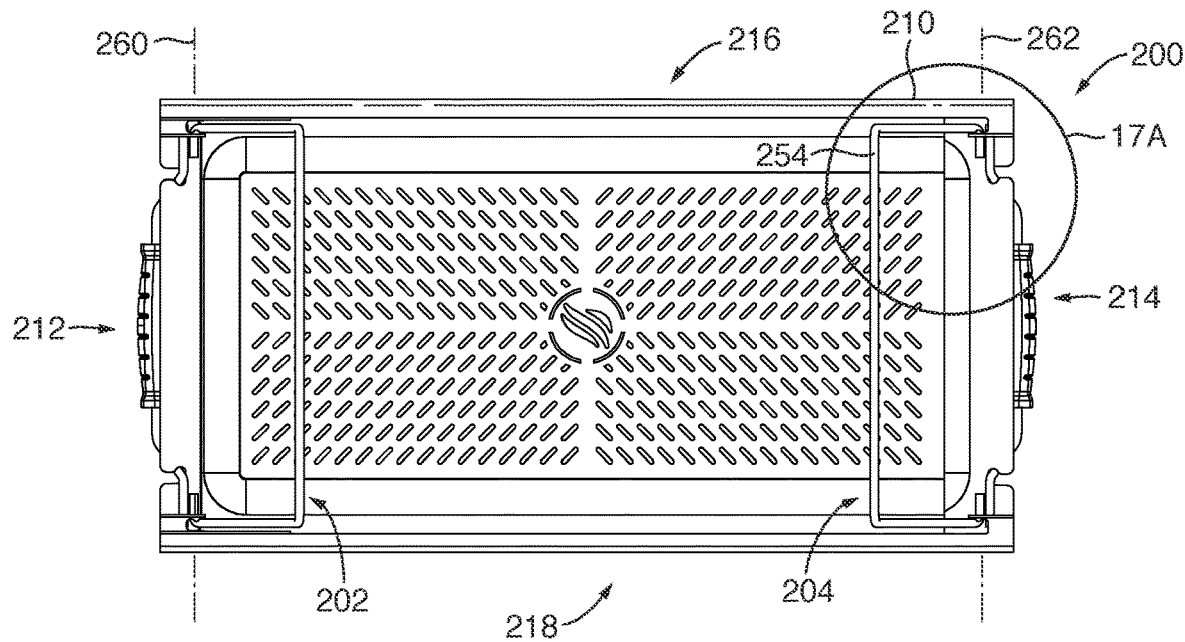
FIG. 17 is a bottom view of the adjustable warming rack with the legs of the rack in the folded position, according to another embodiment of the present invention.
Figure 17A:
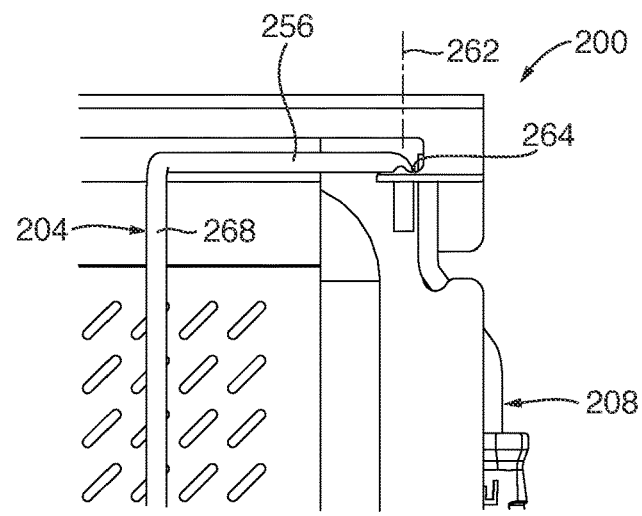
FIG. 17A is an enlarged bottom view of the adjustable warming rack taken from region 17A of FIG. 17, according to another embodiment of the present invention.

Now with reference to FIGS. 14, 16 and 17, the first and second legs 202, 204 may be independently moved or pivoted to modify a height that the adjustable warming rack 200 may be positioned above the flat cooking surface 14 of the griddle 16 (FIG. 2). For example, the first and second legs 202, 204 may each be moved to a pivoted position to adjust the warming rack 200 to a second height 266, the second height 266 being smaller than the first height 250 (FIG. 14). The pivoted position for each of the first and second legs 202, 204 may be an inward pivoting, as shown by respective first and second rotational arrows 251, 253, so that the intermediate base 254 of each of the first and second legs 202, 204 are moved closer to each other. The second height 266 of the warming rack 200 with the first and second legs 202, 204 in the pivoted position moves the warming rack 200 to a low-profile configuration. In some instances, dependent upon the temperature one may be cooking their food on the griddle, the second height 266 or position and low-profile configuration of the warming rack 200 may be helpful in order keep food warm on the warming rack 200 without further cooking the food. As depicted in FIGS. 15, 15A, 17 and 17A, the first and second legs 202, 204 may be moved from the upright position to the pivoted position by rotating the first and second legs 202, 204 about the first and second axes 260, 262, respectively. As the legs are rotated or pivoted, the respective extensions 256 disengage from being positioned within their corresponding notches 264. The first and second legs 202, 204 may pivot to the extent that the extensions 256 may be positioned against the underside 222 of the warming rack 200. The second height 266 may then be defined between the warming rack 200 and a toe end 268 of the intermediate base 254 (see FIG. 16).

Figure 18:
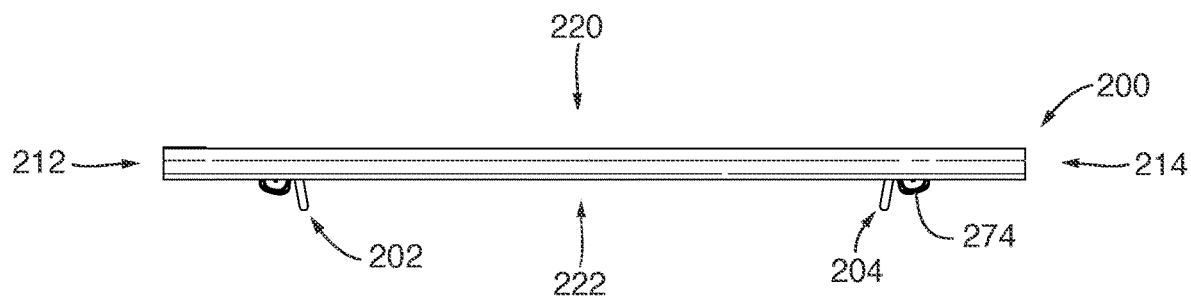
FIG. 18 is a side view of the adjustable warming rack of FIG. 11, depicting the legs and handles of the rack each in a pivoted position so that the rack is in a low-profile storage position, according to another embodiment of the present invention.
Figure 19:
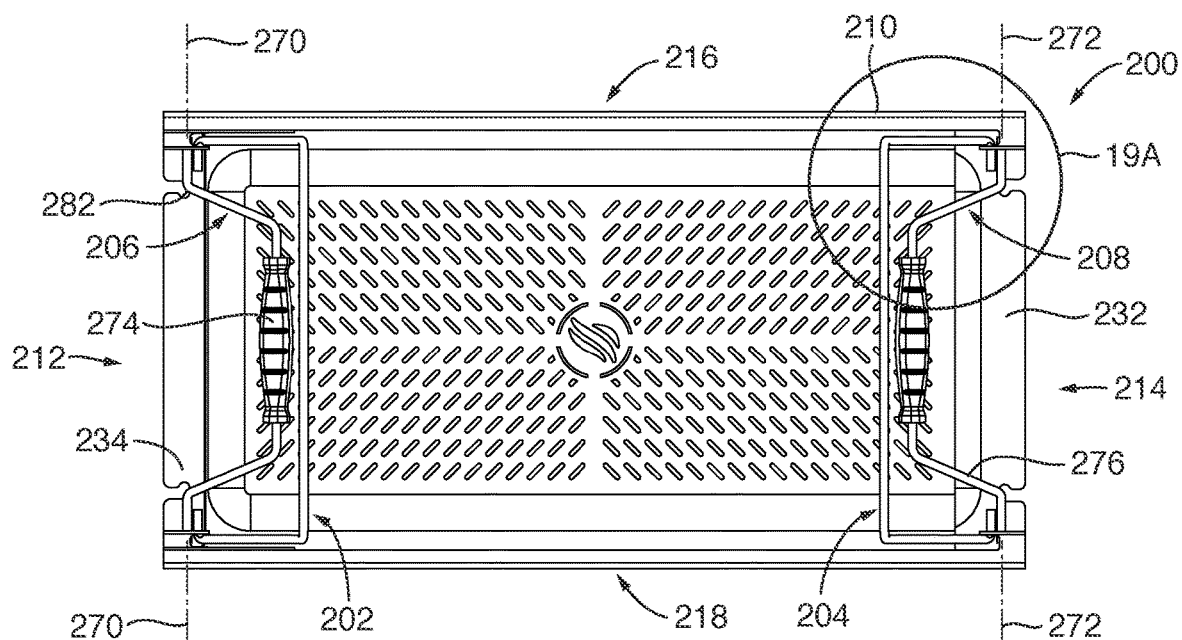
FIG. 19 is a bottom view of the adjustable warming rack with the legs and the handles in the pivoted position, according to another embodiment of the present invention.
Figure 19A:
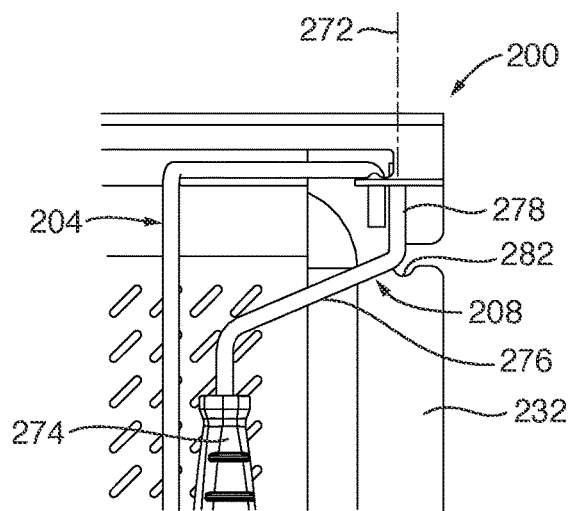
FIG. 19A is an enlarged bottom view of the adjustable warming rack taken from region 19A of FIG. 19, according to another embodiment of the present invention.

With reference to FIGS. 16, 18, 19, 19A and 20, the warming rack may also be moved to a low-profile storage position. In the storage position, the first and second handles 206, 208 may be pivoted about first and second handle axes 270, 272 such that the handles may be rotated from an upright position, as depicted with first and second rotational arrows 255, 257 in FIG. 16, to be pivoted and positioned along the underside 222 of the warming rack 200, as shown in FIG. 18. The first and second handles 206, 208 may each include a handle member 274 that may be centrally positioned over a handle rod 276 with various bends between opposite handle end portions 278. Such opposite handle end portions 278 may be free ends and may be positioned within oppositely positioned holes 280 (see FIG. 13), the oppositely positioned holes 280 for the first and second handles 206, 208 aligned to define the respective first and second handle axes 270, 272. The first and second handles 206, 208 may be maintained in the upright position with the respective handle rods 276 being positioned within one or more handle notches 282 (FIG. 17A) defined in respective upper and lower panels 232, 234 of the rack 200, the handle rods 276 being biased to be held within the handle notches 282. Upon the first and second handles 206, 208 being pivoted about the first and second handle axes 270, 272 to a handle pivoted position, as depicted in FIGS. 19 and 19A, the handle rod 276 may be moved out of the handle notches 282. With the first and second handles 206, 208 in the pivoted position as well as the first and second legs 202, 204 being in the pivoted position, the warming rack 200 may be in the storage position. In the storage position, the first and second legs 202, 204 and the first and second handles 206, 208 may not be visible from a top view of the rack since the legs and handles are pivoted to the underside 222 of the rack 204. With this arrangement, the adjustable warming rack 200 may be advantageous since it may be adjusted relative to the panel surface area for holding food as well as adjusted in height for temperature adjustments relative to the distance the food is positioned from the heated cooking surface and, further, the adjustable warming rack 200 may be minimized in size to a low-profile, storage position, as desired by the user.

The various structural components of the various embodiments of the adjustable warming rack set forth herein may be formed from metallic materials, such as stainless steel, steel or aluminum, or any other suitable metallic material, or polymeric or wood materials for the handles, for example. Further, the panels of the warming rack may be formed from sheet material at various gauges/thicknesses, and other structural components, such as the rod structure, may be formed employing known manufacturing techniques and processes such as welding, rolling, bending, pressing, fastening, etc., as known by one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A warming rack for positioning over a flat cooking surface for keeping cooked food warm, the warming rack comprising:

a rack panel extending between opposite first and second sides and between opposite front and rear sides to define an upper side for placing the cooked food, the rack panel extending with an upper panel and a lower panel, the upper panel moveable relative to the lower panel to modify a surface area defined by the upper side of the rack panel; and first and second legs each pivotably coupled adjacent the respective first and second sides of the rack panel, the first and second legs configured to suspend the rack panel above the flat cooking surface, the first and second legs pivotably moveable to modify a height that the rack panel is suspended from the flat cooking surface.

2. The warming rack of claim 1, wherein the upper panel slidingly engages the lower panel as the upper panel moves relative to the lower panel.

3. The warming rack of claim 1, wherein each of the upper panel and the lower panel define multiple apertures therein, the multiple apertures sized and configured to facilitate convective heat to pass therethrough.

4. The warming rack of claim 1, wherein the upper side of the rack panel defines a border portion and a central region, the central region surrounded by the border portion and the central region being suspended above the flat cooking surface by the first and second legs such that the central region is in closer proximity to the flat cooking surface than the border portion.

5. The warming rack of claim 1, wherein the first and second legs are each coupled to only one of the upper panel and lower panel.

6. The warming rack of claim 1, wherein the upper panel slidingly engages with the lower panel between a first stop and a second stop, upon moving the upper and lower panels to the first stop the rack panel is in a minimized position and, upon moving the upper and lower panels to the second position, the rack panel is in a fully expanded position.

7. The warming rack of claim 1, wherein the first and second legs each are independently moveable to pivot about a first leg axis and a second leg axis, respectively, so that the rack panel is moveable between a first height and a second height, the second height being smaller than the first height.

8. The warming rack of claim 1, wherein the first and second legs are each independently moveable between an upright position and a pivoted position such that the first and second legs pivot about a first leg axis and a second leg axis, respectively, so that the rack panel is moveable between a first height and a second height, the second height being smaller than the first height and the second height being associated with the first and second legs being in the pivoted position.

9. The warming rack of claim 1, further comprising first and second handles moveable between a handle upright position and a handle storage position such that the first and second handles are pivotable about a first handle axis and a second handle axis, respectively, the handle storage position being along an underside of the rack panel.

10. A warming rack for positioning over a flat cooking surface for keeping cooked food warm, the warming rack comprising:
a multi-panel rack including at least a first panel and a second panel, the multi-panel rack extending between opposite first and second sides and between opposite front and rear sides to define an upper side for placing the cooked food thereon, the multi-panel rack moveable between a minimized position and an expanded position with the first panel being moveable relative to the second panel; and
first and second legs each pivotably coupled adjacent the respective first and second sides of the multi-panel rack, the first and second legs configured to suspend the multi-panel rack above the flat cooking surface, the first and second legs configured to be pivotably moveable to modify a height that the rack panel is suspendable above the flat cooking surface.

11. The warming rack of claim 10, wherein the first panel slidingly engages the second panel as the rack panel is moved between the minimized position and the expanded position.

12. The warming rack of claim 10, wherein the first and second legs are each coupled to only one of the first panel and the second panel.

13. The warming rack of claim 10, wherein the first panel is slidable relative to the second panel between a first stop and a second stop, wherein upon the multi-panel rack being at the first stop the rack panel is in the minimized position, wherein upon the multi-rack panel being at the second stop the multi-panel rack is at a fully expanded position.

14. The warming rack of claim 10, wherein the first and second legs each are independently moveable to pivot about a first leg axis and a second leg axis, respectively, so that the multi-panel rack is moveable between a first height and a second height, the second height being smaller than the first height.

15. The warming rack of claim 10, wherein the first and second legs are each independently moveable between an upright position and a pivoted position such that the first and second legs pivot about a first leg axis and a second leg axis, respectively, so that the multi-panel rack is moveable between a first height and a second height, the second height being smaller than the first height and the second height being associated with the first and second legs being in the pivoted position.

16. The warming rack of claim 10, further comprising first and second handles moveable between a handle upright position and a handle storage position such that the first and second handles are pivotable about a first handle axis and a second handle axis, respectively, the handle storage position being along an underside of the rack panel.

17. A method for adjusting a warming rack, comprising:
positioning first and second legs of a warming rack over a flat cooking surface to suspend a rack panel of warming rack a first height above the flat cooking surface, the rack panel including an upper panel and a lower panel;
pivoting the first and second legs of the warming rack to suspend the warming rack a second height above the flat cooking surface such that the second height is less than the first height; and
expanding the rack panel from a minimized position to an expanded position by moving the upper panel relative to the lower panel such that the expanded position of the rack panel extends to define a larger upper side surface than the upper side surface of the rack panel in the minimized position.

18. The method according to claim 17, further comprising pivoting first and second handles of the warming rack from an upright position above the rack panel to a handle pivoted position such that the first and second handles are positioned along an underside surface of the rack panel.

19. The method according to claim 17, wherein the expanding the rack panel comprises slidingly engaging the upper panel relative to the lower panel.

20. The method according to claim 17, wherein the pivoting comprises incrementally pivoting the first and second legs of the warming rack with an adjustment member associated with each of the first and second legs so that the rack panel is moveable to different heights that correspond with an incremental pivoted position of the first and second legs.

* * * * *